United States Patent
Saini et al.

(10) Patent No.: US 9,272,638 B2
(45) Date of Patent: Mar. 1, 2016

(54) TARGET ACTIVATED SENSOR

(75) Inventors: Karanjit Singh Saini, Plainville, MA (US); Gennady Baskin, Newton, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 745 days.

(21) Appl. No.: 13/050,257

(22) Filed: Mar. 17, 2011

(65) Prior Publication Data

US 2011/0254539 A1 Oct. 20, 2011

Related U.S. Application Data

(60) Provisional application No. 61/314,785, filed on Mar. 17, 2010.

(51) Int. Cl.
*G01B 7/14* (2006.01)
*B60N 2/07* (2006.01)
*G01B 7/02* (2006.01)
*G01D 5/14* (2006.01)
*G01B 7/00* (2006.01)
*B60N 2/02* (2006.01)

(52) U.S. Cl.
CPC .............. *B60N 2/0705* (2013.01); *G01B 7/023* (2013.01); *G01D 5/145* (2013.01); *B60N 2002/0272* (2013.01); *G01B 7/003* (2013.01)

(58) Field of Classification Search
CPC ....... G01D 5/145; G01D 5/147; G01B 7/023; G01B 7/003
USPC ..................... 324/207.26, 207.2, 207.24, 251
See application file for complete search history.

(56) References Cited

U.S. PATENT DOCUMENTS

| | | |
|---|---|---|
| 5,273,354 A | 12/1993 | Herrmann et al. |
| 6,282,942 B1 | 9/2001 | Husby |
| 6,921,107 B2 | 7/2005 | Mills et al. |
| 7,005,848 B2 | 2/2006 | Suzuki et al. |
| 7,193,412 B2 | 3/2007 | Freeman |
| 7,439,735 B2 | 10/2008 | Barnabo et al. |
| 7,454,979 B2 | 11/2008 | Frank et al. |
| 7,521,922 B2 | 4/2009 | Stuve |

(Continued)

OTHER PUBLICATIONS

Office Action dated May 5, 2006 issued in related U.S. Appl. No. 11/089,042.

(Continued)

*Primary Examiner* — Reena Aurora
(74) *Attorney, Agent, or Firm* — Grossman, Tucker, Perreault & Pfleger, PLLC

(57) ABSTRACT

A sensor assembly configured to sense a position of a seat in a vehicle includes a housing defining a cavity and having an open end. The sensor assembly may also include a carrier removably disposed in the housing cavity via the open end, wherein a permanent magnet may be disposed within a magnet cavity defined in the carrier, wherein the permanent magnet may establish a magnetic field. The sensor assembly may further include a single pole disposed within a pole cavity defined in the carrier and spaced from the permanent magnet and positioned in the magnetic field. In addition, the sensor assembly may include a magnetic sensor element affixed to a printed circuit board (PCB) and positioned in the magnetic field and adjacent to an end of the single pole. The magnetic sensor element and PCB may be at least partially disposed within the cavity.

14 Claims, 9 Drawing Sheets

(56) References Cited

U.S. PATENT DOCUMENTS 7,564,234 B2 7/2009 Endoh
2002/0005715 A1 1/2002 Sato

OTHER PUBLICATIONS

Notice of Allowance dated Nov. 14, 2006 issued in related U.S. Appl. No. 11/089,042.

International Search Report and Written Opinion dated May 12, 2011 issued in related International Patent Application No. PCT/US2011/028828.

TARGET ACTIVATED SENSOR

CROSS-REFERENCE TO RELATED APPLICATIONS

The present application claims the benefit of U.S. Provisional Patent Application Ser. No. 61/314,785, filed Mar. 17, 2010, the entire disclosure of which is incorporated herein by reference. Additionally, the present application is related to U.S. Pat. No. 7,193,412, the teachings of which are incorporated herein by reference.

FIELD

The present disclosure relates generally to position sensors, and, more particularly, to a target activated sensor that provides an output indicative of a position of a target relative thereto.

BACKGROUND

In a wide variety of applications it is advantageous or necessary to sense the position of a linearly or rotationally movable element. For example, in automobile seat applications the seat may be linearly movable, either manually or automatically via electro-mechanical means, on an associated track assembly. A sensor may provide a signal representative of the linear position of the seat on the track for a variety of purposes, e.g. to control deployment of an air bag, to control the electro-mechanical actuator that causes translation of the seat in connection with a seat position memory feature, etc.

For a seat position application, it is increasingly desirable for a sensor to provide multiple position outputs for purposes of ascertaining occupant position. For example, in applications where seat position is used to control air bag deployment early configurations involved only single stage air bag systems. A single stage air bag deploys with a known deployment force that may not be varied. In this application, seat position information was used only to determine when the airbag should be deployed. However, the advent of dual stage air bags, i.e. air bags that may be deployed with two distinct deployment forces, required increased resolution in position sensing. Also, the industry has moved to variable stage airbags where the deployment force may be varied depending upon occupant position and classification. Variable stage airbag configurations require a sensor configuration that can detect multiple seat positions for use in determining the appropriate deployment force.

Another desirable feature of a position sensor, especially in the context of an automobile seat application, is that it be a non-contact sensor. A non-contact sensor includes a sensing element that does not physically contact the sensed object, allowing quiet operation of the sensor and minimizing wear. Preferably, the sensor operates with a relatively large air gap between the sensor and the sensed object to avoid inadvertent contact due to manufacturing or assembly variances.

Another issue associated with seat position sensors is that the seat track environment is very crowded with limited physical space for such sensors. Also the space available for the sensor may vary among vehicle types. As such, sensors which are compact in size are desirable.

Accordingly, there is a need for a seat position sensor that is compact in size and is configured to operate with a relatively large air gap.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION

For ease of explanation, sensor systems consistent with the invention will be described herein in connection with an automobile seat position sensing application. It will be recognized, however, that sensor systems consistent with the invention will be useful in other applications for sensing linear and/or rotational movement of an element. In addition, exemplary embodiments described herein include use of Hall Effect sensors and a magnet. Those skilled in the art will recognize, however, that a variety of sensing means may be used. For example, optical, magneto-resistive sensors, etc. may be useful in connection with a sensor system consistent with the invention. It is to be understood, therefore, that illustrated exemplary embodiments described herein are provided only by way of illustration, and are not intended to be limiting.

Figure 1:
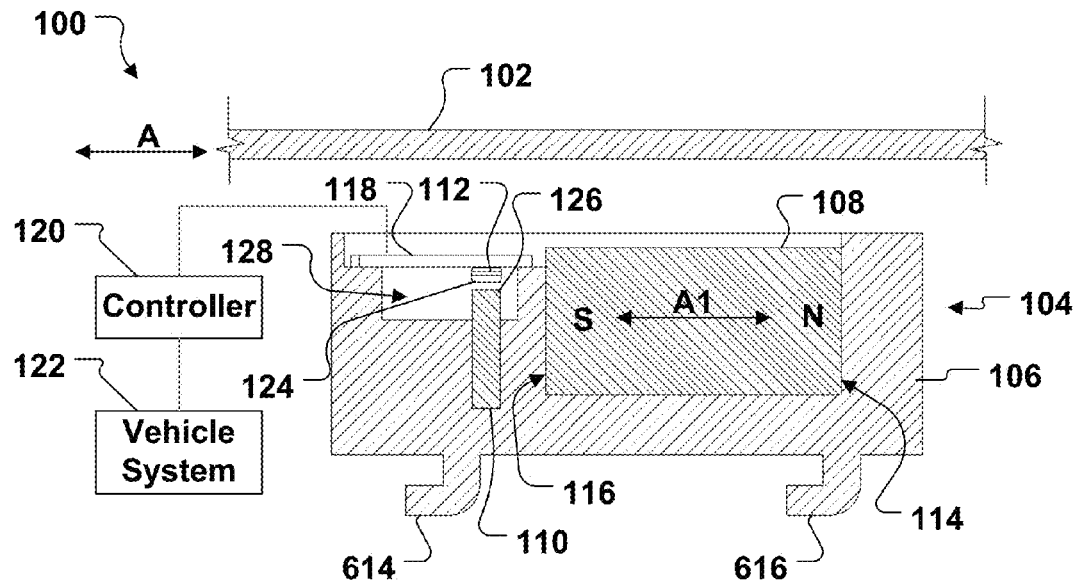
FIG. 1 is a schematic partial side-sectional view of an exemplary target activated position sensor consistent with the present disclosure.

Referring to FIG. 1, one exemplary target activated sensor system 100 consistent with the present invention is shown in detail. The illustrated exemplary sensor system includes a target 102 (or flag) and a sensor assembly 104 including a sensor housing 106 carrying a magnet 108, a single pole 110, and a magnetic sensor element 112. In general, the sensor assembly 104 and target 102 may be mounted in a system, e.g. a seat position sensing system, in a manner allowing relative movement therebetween. For example, the target 102 may be coupled to a movable rail of a seat assembly or incorporated and/or integrally formed with at least a portion of the movable rail, and the sensor assembly 104 may be coupled to a stationary rail of a seat assembly. Alternatively, the target 102 may be coupled to the fixed rail of the seat assembly or incorporated and/or integrally formed with at least a portion of the fixed rail, and the sensor assembly 104 may be coupled to the moveable rail of the seat assembly.

When the target 102 is at a distance from the sensor assembly 104 a first level of magnetic flux from the magnet may be imparted to the magnetic sensor element 112, resulting in a first output from the magnetic sensor element 112. When the target 102 is positioned proximate the sensor assembly 104, as shown, for example in FIG. 1, the target 102 may cause an increased level of magnetic flux to be imparted to the magnetic sensor element 112, compared to the first level of flux, resulting in a second output from the magnetic sensor element 112. The output level of the magnetic sensor element 112 may thus be indicative of the position of the target 102 relative to the sensor assembly 104. When, for example, the target 102 is positioned on a movable rail of a seat assembly (shown and described in greater detail later) and the sensor assembly 104 is affixed to a stationary rail of the seat assembly, the output of the magnetic sensor element 112 is indicative of the position of the movable rail and the seat affixed thereto, relative to the stationary rail.

With continued reference to FIG. 1, the target 102 may be constructed from a ferromagnetic material and may be configured to move relative to the sensor assembly in a direction indicated by arrow A. The magnet 108 may be disposed at least partially in the housing 106 and may be magnetized in a direction indicated by arrow A1 which is substantially parallel, e.g. within manufacturing and assembly tolerances, to the direction of movement of the target 102. In one embodiment, for example, the magnet 108 may be magnetized such that a first end 114 represents a north (N) pole of the magnet and a second end 116 represents a south (S) pole of the magnet.

The single pole 110 may be constructed from a ferromagnetic material and may be of unitary or multi-piece construction. The pole 110 may be disposed in the housing at a fixed distance from the second end 116 of the magnet and within the magnetic field established by the magnet 108. In the illustrated exemplary embodiment, the magnetic sensor element 112 is affixed to a printed circuit board (PCB) 118. The PCB 118 may carry conductive paths and/or electronics for communicating the sensor element outputs to a controller 120 for controlling a vehicle system 122, e.g. a vehicle air bag, seat position controller, etc., in response, at least in part, to the outputs of the magnetic sensor element 112.

In one exemplary embodiment, the magnetic sensor element 112 may be configured as a Hall Effect sensor positioned on the PCB 118 with a flux receiving surface 124 of the sensor spaced from and in opposing relationship to an end surface 126 of the single pole 110. The output of the Hall Effect sensor may vary in response to the level of flux density imparted to the flux receiving surface 124. The flux receiving surface 124 of the sensor may thus be substantially parallel, e.g. within manufacturing and assembly tolerances, to the direction of magnetization of the magnet 108, as indicated by arrow A1. Placing the magnetic sensor element 112 in this position relative to the direction of the magnetization of the magnet 108 can, compared to other orientations, reduce the vector component of the magnetic field from the magnet that affects the sensor.

In one exemplary embodiment, the Hall Effect sensor may be a well-known and commercially available solid state, low current device with diagnostic capability. A two terminal Hall Effect sensor may be used to achieve operation over a wide voltage and temperature range and provide two current output levels, e.g. 5.5 mA and 15 mA. A programmable Hall Effect sensor may be used to allow selection of the Hall switch point.

The housing 106 may include a cavity 128 for receiving the end surface 126 of the pole piece and the magnetic sensor element 112. The PCB 118 may extend across the cavity 128 to opposing sides thereof, and may be sealed within the housing by a housing cover 130 (shown in FIG. 4). Sealing of the cover 130 over the PCB 118 may be accomplished by a variety of means including, but not limited to, a perimeter seal, grommet, o-ring, epoxy, ultrasonic welding, over-molding, etc. The cover 130 may extend over the magnet 108 to seal the magnet 108 within the housing 106. Alternatively, the cover 130 may be positioned so as to leave the magnet 108 exposed at an open side of the housing 106 to allow close positioning of the magnet 108 to the target 102.

Figure 2:
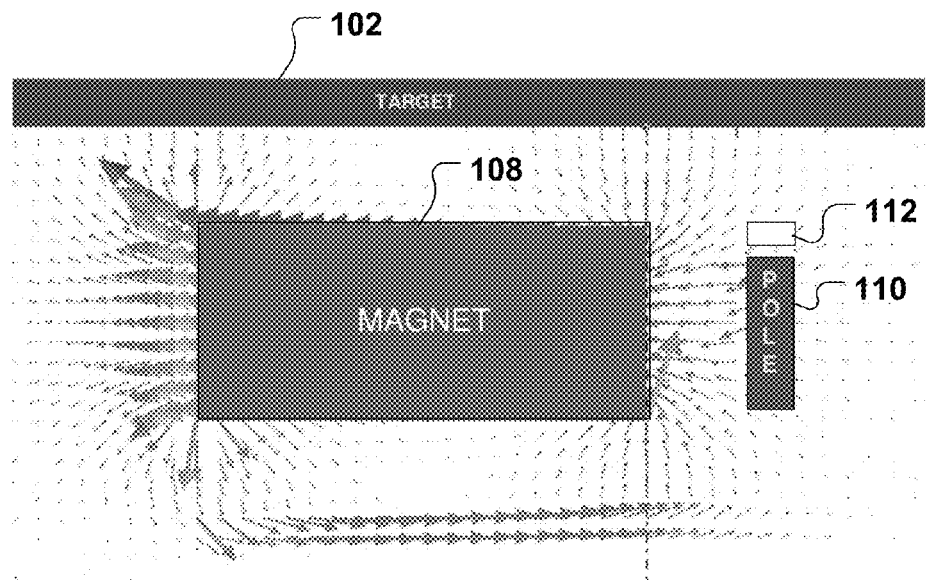
FIG. 2 is a schematic diagram illustrating magnetic fields associated with an exemplary target activated position sensor consistent with the present invention.

Referring to FIG. 2, the target 102 may be positioned relative to the sensor assembly 104 to direct an increased magnetic flux through the magnetic sensor element 112, with no intervening ferromagnetic pole between the sensor and the target, compared to when the target 102 is not in proximity to the sensor assembly.

Figure 3:
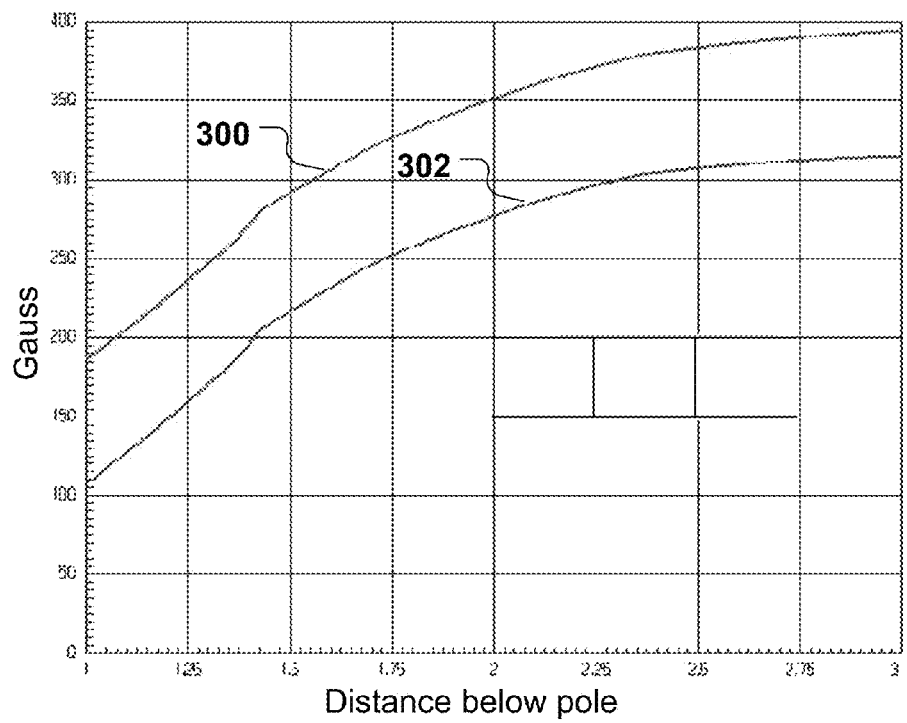
FIG. 3 includes plots of gauss vs. distance showing magnetic flux at various distances from an end of a single pole when a target is present and when a target is not present in an exemplary target activated position sensor consistent with the present disclosure.

FIG. 3 includes plots 300 and 302 of magnetic flux (gauss) at various distances from the end surface 126 of the pole 110, i.e. moving in the direction of the target 102 shown in FIG. 1. Plot 300 is a plot of gauss vs. distance from the pole 110 when a target 102 is present at 6 mm from the pole, and plot 302 is a plot of gauss vs. distance from the pole 110 when no target 102 is present. As shown, when the target 102 is present the flux is greater at distances from the end surface 126 of the pole 110, i.e. in the location of the magnetic sensor element 112, than when no target 102 is present. In addition, the difference (delta) between the flux present at a particular distance from the pole when the target 102 is present and when the target 102 is not present is about 80 gauss or more over a range of distances from 1 mm to 3 mm. The relative positioning of the components 108, 110 and 112 may be chosen to achieve a desired delta (target present—not present) to accommodate a particular Hall Effect sensor selection, and/or a programmable Hall Effect sensor may be used to compensate for opening manufacturing tolerances.

Figure 4:
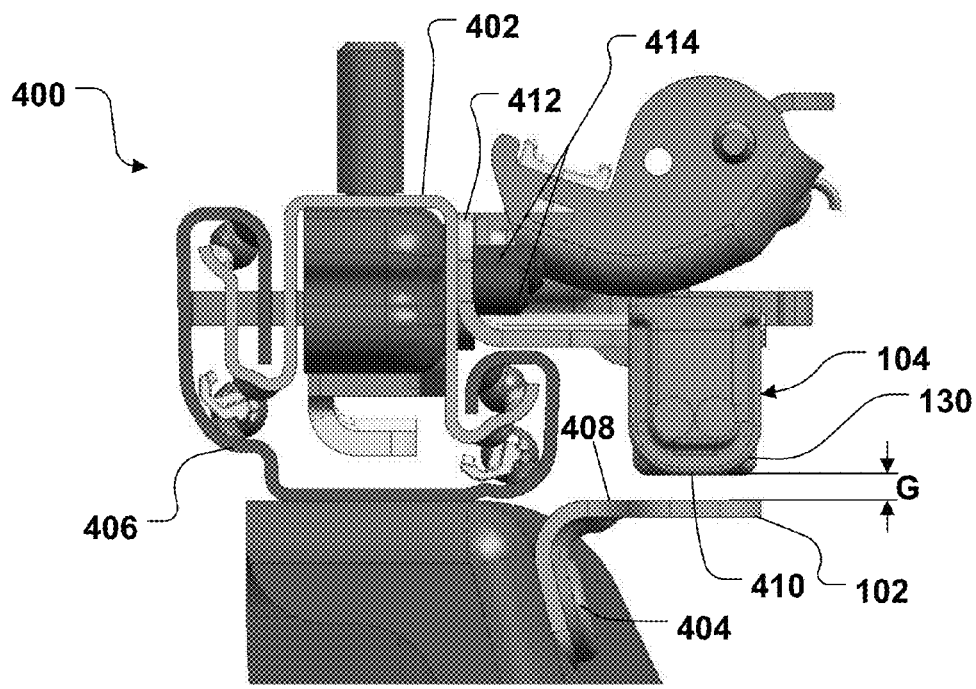
FIG. 4 is an end view of a portion of a vehicle seat assembly incorporating an exemplary target activated position sensor showing the target positioned in proximity to the sensor.
Figure 5:
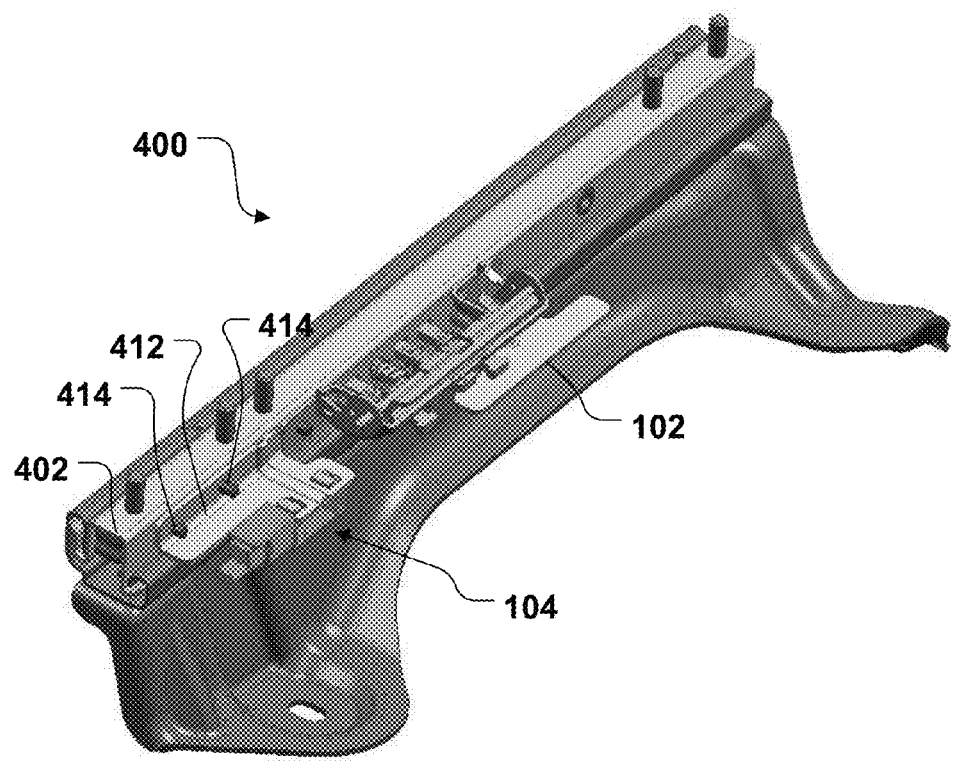
FIG. 5 is a side perspective view of the assembly of FIG. 4 showing the target positioned at a distance from the sensor.

FIGS. 4 and 5 illustrate an exemplary application of the target activated sensor system consistent with the present invention configured for sensing the position of a vehicle seat (not shown) affixed to a vehicle seat rail assembly 400. FIG. 4 is an end view of a portion of the vehicle seat rail assembly 400 incorporating an exemplary target activated position sensor showing the target 102 positioned in proximity to the sensor assembly 104. FIG. 5 is a side perspective view of the assembly of FIG. 4 showing the target 102 positioned at a distance from the sensor assembly 104.

In the illustrated embodiment, the sensor assembly 104 is mounted on a movable rail 402 of the seat assembly 400 and moves relative to the target 102 (e.g., a flag) which is mounted to a fixed portion of the seat assembly 400, e.g. via a fastener 404. Alternatively, the sensor assembly 104 may be fixed and the target 102 may be movable. Also, one of the target 102 or sensor assembly 104 may be directly affixed to the stationary rail 406 of the seat assembly. Alternatively, the target 102 may be integrally formed with at least a portion of the movable rail 402 and the sensor assembly 104 may be mounted to the stationary rail 406.

In the illustrated embodiment, the sensor assembly 104 may be mounted to the seat rail assembly 400 through a mounting bracket 412 via studs 414 (described in greater detail below). The target 102 may be positioned with a surface 408 thereof in opposed facing relationship to a bottom surface 410 of the sensor assembly 104 and the magnet 108 to establish an air gap G between the magnet 108 of the sensor assembly 104 and the target 102. In one embodiment, the air gap G may be 3 mm±2 mm. Advantageously, however, a sensor system consistent with the invention may be configured with an air gap in excess of 5 mm. Use of a magnet 108 that is relatively long compared to its width contributes to the large air gap, while allowing use of a low grade magnet. In one embodiment, for example, the magnet 108 may have a length in its direction of magnetization of about 22-23 mm, a width of about 7-8 mm, and a height of about 9-10 mm.

Figure 6:
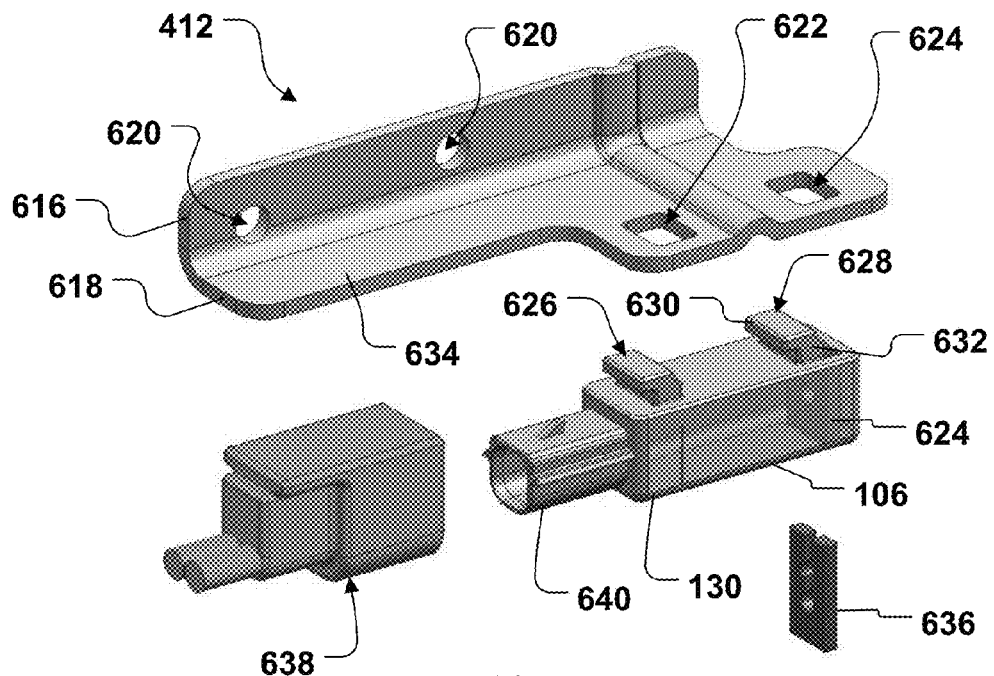
FIG. 6 is an exploded view of one exemplary housing and mounting bracket configuration useful in connection with a target activated position sensor consistent with the present disclosure.

FIG. 6 is an exploded view of one exemplary housing and mounting bracket configuration useful in connection with a target activated position sensor consistent with the present disclosure. In the illustrated embodiment, the mounting bracket 412 may be constructed from a ferrous or non-ferrous material and may be generally L-shaped including first 616 and second 618 arms. The first arm 616 of the bracket 412 may include openings 620 therein for receiving corresponding studs 414 extending from a side surface of the movable rail 402 of the seat assembly 400. The studs 414 may pass through the openings 620 and may be secured against removal from the openings, e.g. by welding or an appropriate clip or fastener.

The second arm 618 of the bracket 412 may include first 622 and second 624 mounting openings for receiving first 626 and second 628 associated mounting flanges extending from the sensor housing 106. Each of the mounting flanges 626, 628 may be generally L-shaped having a first arm 630 and a second arm 632. To mount the sensor assembly 104 to the bracket 412, the first and second flanges 626, 628 may be passed through the associated openings 622, 624 and the first arms 630 may be positioned to overlay a top surface 634 of the bracket 412 adjacent the first and second openings 622, 624. Play between the mounting flanges 626, 628 and the openings 622, 624 may be removed by a positive locking clip 636 inserted between the flanges 626, 628 and rear surfaces of the openings 622, 624 and into the sensor housing 106. Electrical connections from the PCB 118 to, for example, the controller 120 may be established through a connector 638 configured to securely mate with an associated receptacle 640 extending from the sensor housing 106.

Advantageously, a sensor system with a single pole consistent with the present disclosure may be operated at a large air gap and may be provided in a compact package. In one embodiment for example, the sensor assembly 104, as shown in FIG. 1 may have dimensions of about 15 mm×15 mm×35 mm, excluding the mounting flanges 626, 628. This small size is accommodating the limited space available in existing seat track assemblies.

Figure 7:
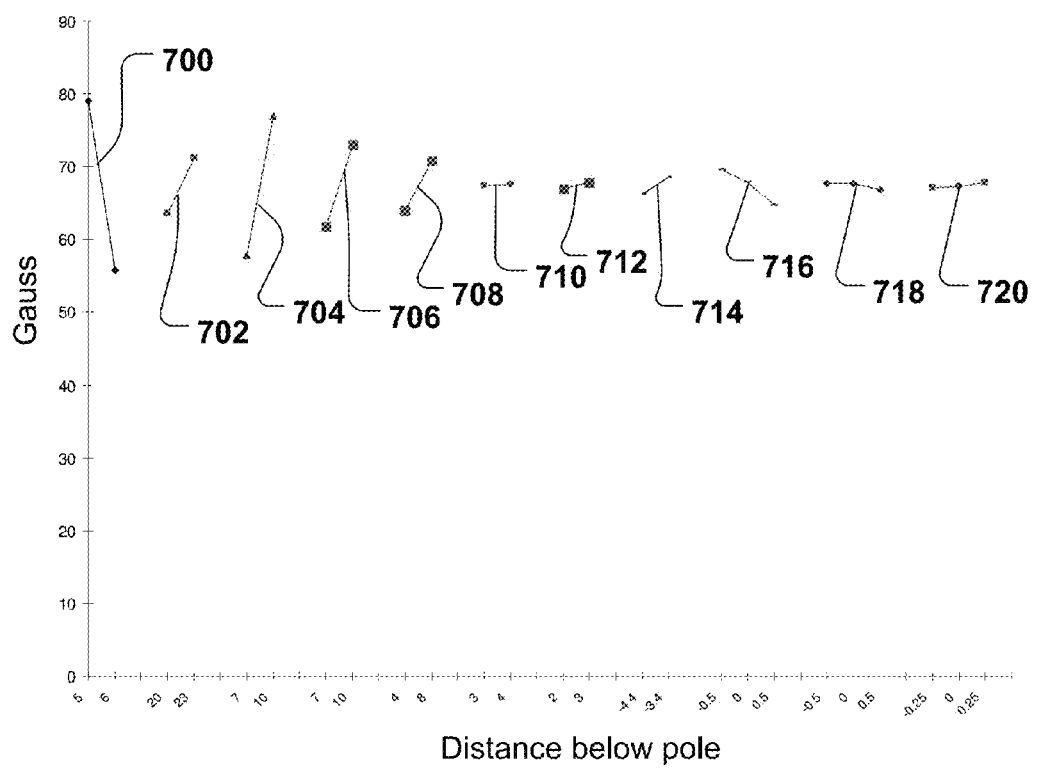
FIG. 7 includes plots of the difference in flux sensed by a magnetic sensor element when a target is present and not present vs. dimension showing the effect on the difference resulting from variation the dimension of eleven different component and tolerance variables associated with an exemplary target activated position sensor consistent with the present disclosure.

Another advantage of the sensor assembly including a single pole consistent with the invention is robustness to manufacturing and assembly tolerances of the components. FIG. 7, for example, includes plots of the delta (target present—not present) in gauss vs. eleven different variable component and assembly dimensions. Plots 700-720 are plots of delta vs. air gap, magnet length, magnet width, magnet height, pole height, pole width, pole thickness, the distance from a Hall sensor sensing element to the magnet, and the hall sensor x, y and z position tolerances, respectively, for an exemplary embodiment of a sensor assembly 104 consistent with the present invention. As shown, the delta shows little change if the eleven variables are varied up to ten times greater than the variation would be in production. In addition, the variables with the greatest affect on delta are generally component tolerances not assembly tolerances. Thus, a sensor consistent with the present invention enables less precision and more efficiency in manufacturing.

A sensor assembly consistent with the present disclosure may also be configured to operate using one of the movable or stationary rails 402, 406 as the target without using a separate target 102 mounted to the rail or adjacent to the rail. In one embodiment, for example, the sensor assembly 104 may be connected to at least one of the rails 402, 406 and sense the presence or absence of the other rail (either 402 or 406) to avoid use of a separate target 102 to minimize cost.

Figure 8:
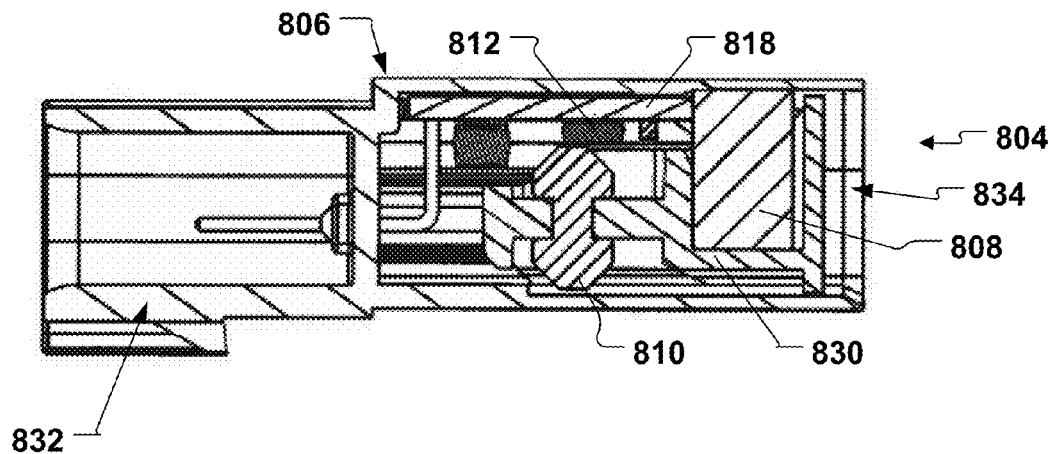
FIG. 8 is a schematic side-sectional view of an exemplary sensor assembly consistent with the present disclosure.
Figure 9:
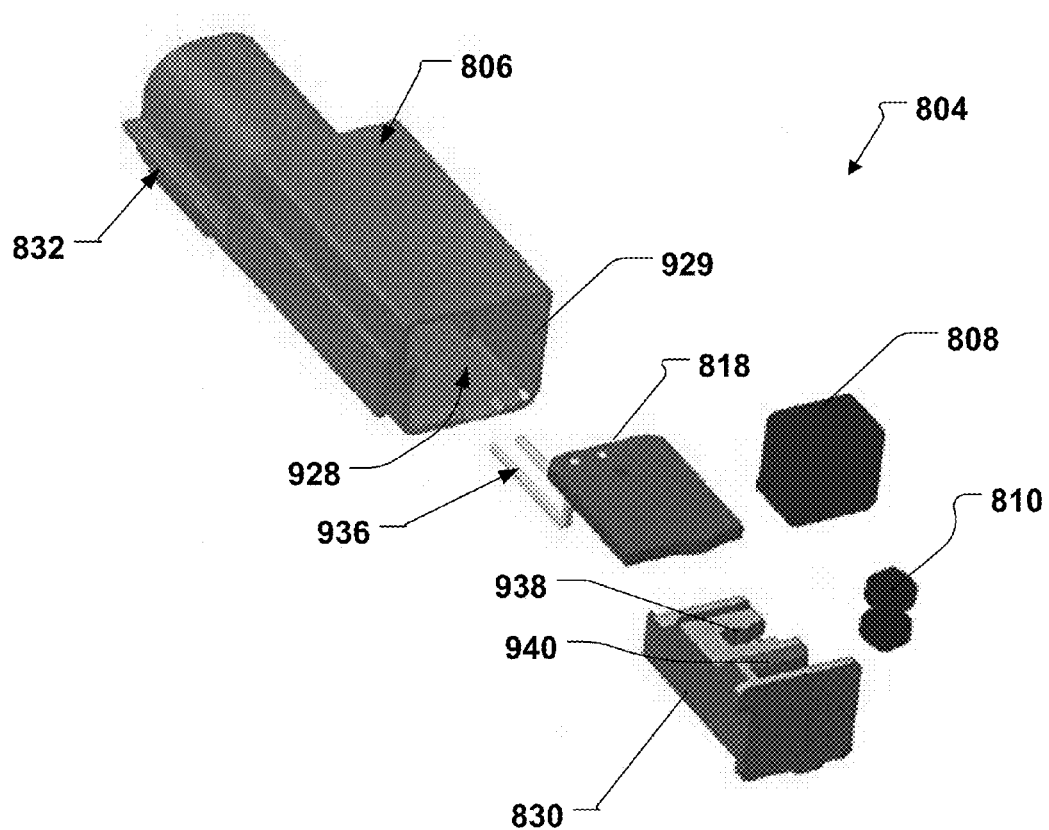
FIG. 9 is an exploded view of the assembly of FIG. 8.

FIG. 8 is a schematic side-sectional view of an exemplary sensor assembly consistent with the present disclosure and FIG. 9 is an exploded view of the assembly of FIG. 8. This embodiment is similar to the embodiment of FIG. 1, and like components have been assigned like reference numerals. Referring to FIG. 8, the sensor assembly 804 includes a sensor housing 806, a magnet 808, a single pole 810, a printed circuit board (PCB) 818, a magnetic sensor element 812, a carrier 830, and an integral connector 832.

The magnet 808 may be a magnet having a relatively small reversible temperature coefficient compared to a ferrite magnet, i.e. the magnet may to lose/gain less magnetic field value with temperature compared to a ferrite magnet. For example the magnet may be an NdFeB or SmCo magnet to allow the sensor to distinguish between the movable and fixed rails over a high temperature range even though the two rails are in close proximity to each other. Also, an NdFeB/SmCo magnet allows use of a physically small magnet and sensor size. The magnet 808 may be magnetized in the same manner and configuration as shown in FIG. 1 with respect to the magnet 108, e.g. in a direction indicated by arrow A1, as shown with respect to the magnet 108 in FIG. 1, which is substantially parallel, e.g. within manufacturing and assembly tolerances, to the direction of relative movement of the rail to be sensed by the sensor, or may be substantially perpendicular to the direction indicated by arrow A1. In one embodiment, for example, the magnet 808 may be magnetized such that a first end represents a north (N) pole of the magnet 808 and a second end represents a south (S) pole of the magnet 808, e.g. in the orientation shown in FIG. 1. Also, in one embodiment, the magnet 808 may be an 8×8×5 mm NdFeB magnet.

The single pole 810 may be constructed from a ferromagnetic material and may be of unitary or multi-piece construction. The pole 810 may be disposed in the housing 806 at a fixed distance from the end of the magnet 808 and within the magnetic field established by the magnet 808. In one embodiment, the pole 810 may be 4 mm in diameter and about 7 mm long and machined from ferrous steel.

In the illustrated exemplary embodiment shown in FIGS. 8-9, the magnetic sensor element 812 is affixed to the PCB 818. The PCB 818 may carry conductive paths and/or electronics for communicating the sensor element outputs through contacts 936 coupled to the PCB 818 and exposed at the integral connector 832 to the controller 120 for controlling a vehicle system 122, e.g. a vehicle air bag, seat position controller, etc., in response, at least in part, to the outputs of the magnetic sensor element 812. In one exemplary embodiment, the magnetic sensor element 812 may be configured as a Hall Effect sensor positioned on the PCB 818 with a flux receiving surface of the sensor spaced from and in opposing relationship to an end surface of the single pole 810. The output of the Hall Effect sensor may vary in response to the level of flux density imparted to the flux receiving surface. The flux receiving surface of the sensor may thus be substantially parallel or perpendicular, e.g. within manufacturing and assembly tolerances, to the direction of magnetization of the magnet 108, as indicated by arrow A1.

Referring to FIG. 9, the sensor assembly 804 includes a carrier 830 configured to be removably disposed in a cavity 928 of the housing 806 via an open end 929 of the housing 806. The pole 810 and the magnet 808 may be provided in associated cavities 938, 940, respectively, defined in the carrier 830. The carrier 830 may be at least partially disposed within. The carrier 830 and housing 806 may be molded from a plastic, e.g. a thermoplastic such as Nylon. The PCB 818 may extend across at least a portion of the cavity 928, and may be sealed within the housing 806 by a housing cover 834. Sealing may be accomplished by a variety of means including, but not limited to, a perimeter seal, grommet, o-ring, epoxy, ultrasonic welding, over-molding, etc.

Figure 10:
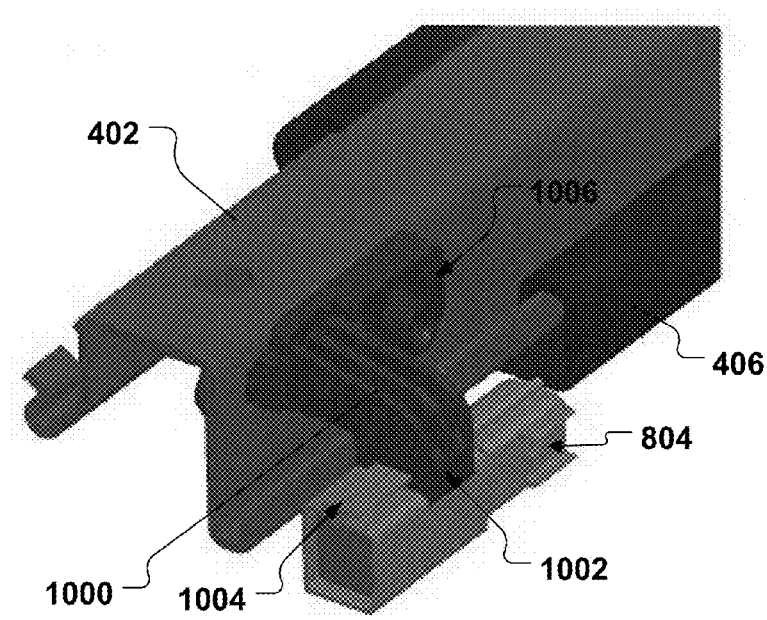
FIGS. 10-11 are perspective views showing the assembly of FIG. 8 mounted relative to first and second rails of a seat rail assembly.
Figure 11:
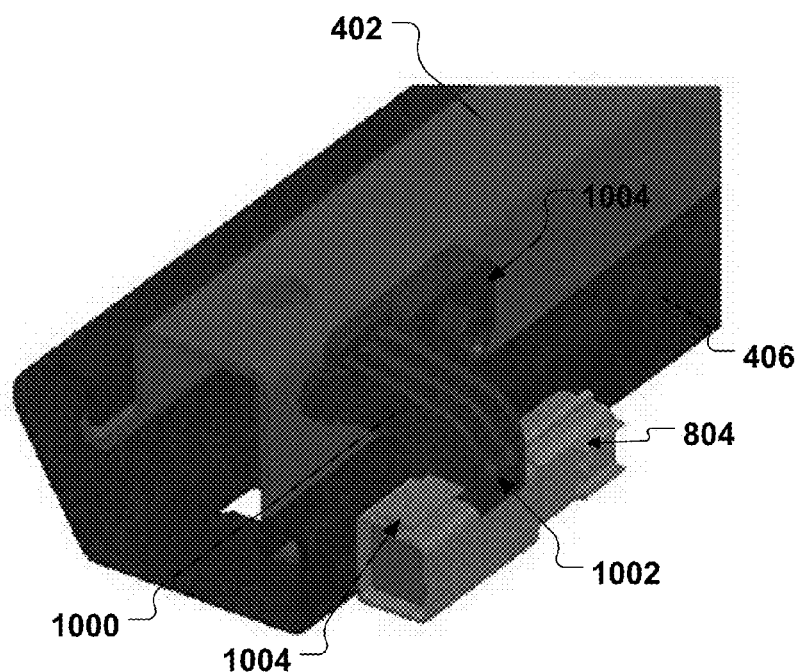
Figure 12:
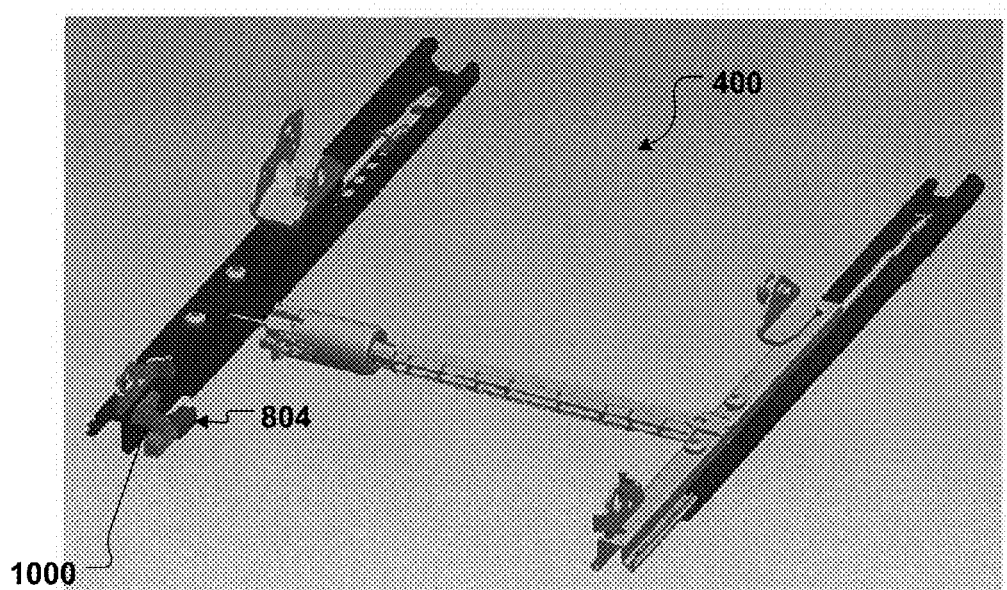
FIG. 12 is a perspective view of a seat rail assembly consistent with the present disclosure.
Figure 13:
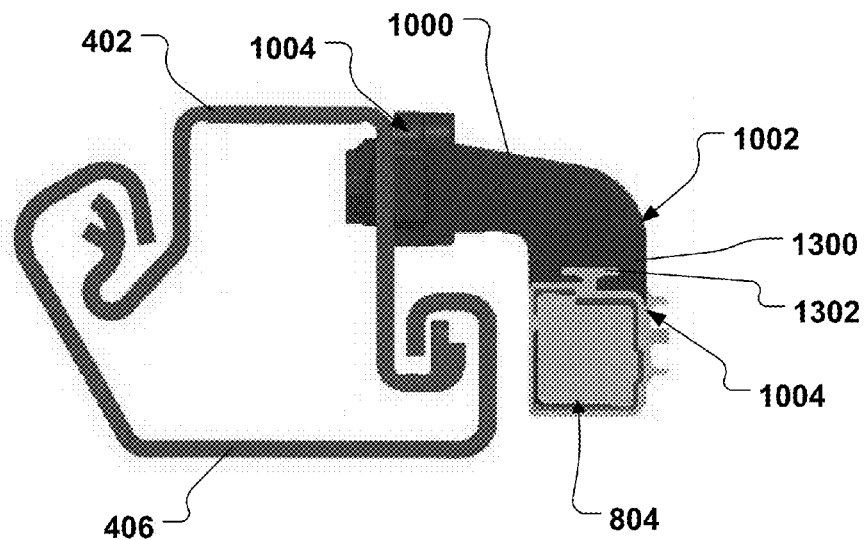
FIGS. 13 and 14 are perspective views of the assembly of FIG. 8 mounted relative to first and second rails of a seat rail assembly.
Figure 14:
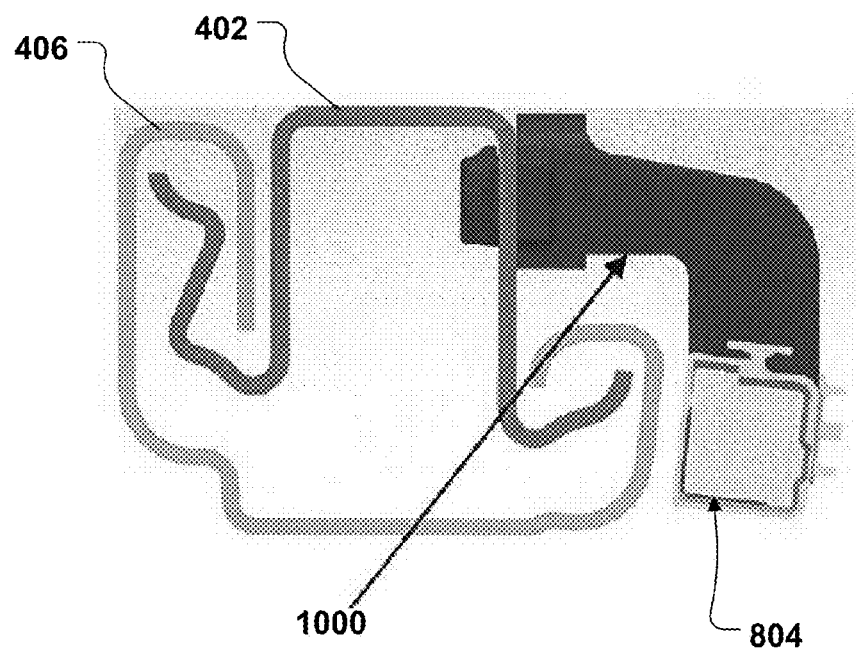

FIGS. 10-11 are perspective views showing the assembly of FIG. 8 mounted relative to first and second rails of a seat rail assembly. FIG. 12 is a perspective view of a seat rail assembly consistent with the present disclosure. FIGS. 13 and 14 are perspective views of the assembly of FIG. 8 mounted relative to first and second rails of a seat rail assembly. In general, the sensor assembly 804 may be coupled directly to one of the rails 402, 406 (shown in FIGS. 10-11) for sensing the presence and/or absence of the other one of the rails. In the embodiment shown in FIGS. 10-14, for example, the sensor 804 may be mounted to the movable rail 402 for sensing the presence or absence of the stationary rail 406. When the stationary rail 406 is at a distance from the sensor assembly 804, e.g. as shown in FIGS. 10 and 13, a first level of magnetic flux from the magnet 808 may be imparted to the magnetic sensor element 812, resulting in a first output from the magnetic sensor element 812. When the stationary rail 406 is positioned proximate the sensor assembly 804, as shown, for example in FIG. 11, the stationary rail 406 may cause an increased level of magnetic flux to be imparted to the magnetic sensor element 812, compared to the first level of flux, resulting in a second output from the sensor 812. The output level of the magnetic sensor element 812 may thus be indicative of the position of the stationary rail 406 relative to the sensor assembly 804. In the illustrated embodiment, when the sensor 804 is coupled to the movable rail 402 of a seat assembly, the output of the magnetic sensor element 812 is indicative of the position of the stationary rail 406 of the seat assembly relative to the movable rail 402, thereby allowing the position of the seat relative to the stationary rail 406 to be determined.

In operation, the difference (delta) between the magnetic field value when the sensed rail is present and when it is not present determines the sensor operation at temperature extremes. The magnetic field that the Hall sensor sees is also a function of the operating air gap and surrounding ferrous materials. Advantageously, the magnetic circuit, i.e. the path of the flux from the magnet through the pole and rails may be configured so that a ferrous member is not necessary at the back of the sensor.

Figure 15:
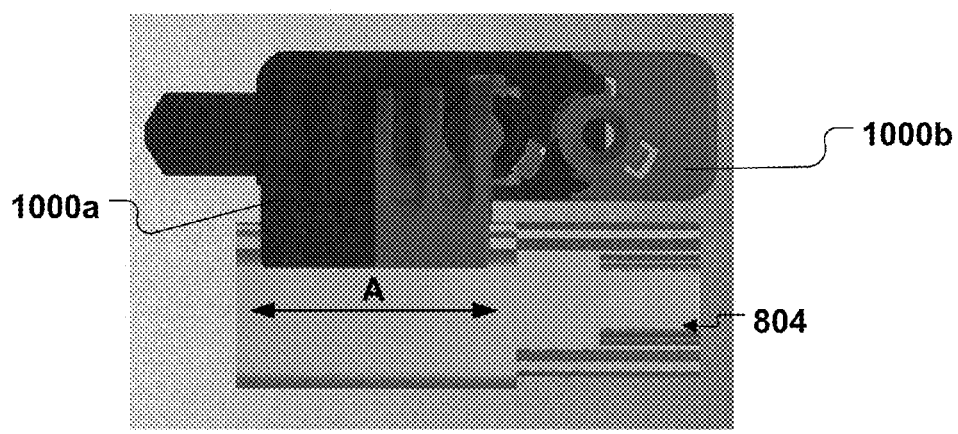
FIGS. 15-17 illustrate various mechanical connections for coupling a sensor assembly consistent with the present disclosure to a rail of a seat assembly.

In the illustrated embodiment, the sensor assembly 804 may be coupled to one of the rails 402, 406 by a flexible plastic (e.g. a molded thermoplastic such a Nylon) bracket 1000 having a first end 1002 coupled to at least a portion 1004 of the housing 806 of the sensor assembly 804. The plastic bracket 1000 also includes a second end 1006 coupled to at least a portion of one of the rails 402, 406. Referring to FIGS. 13 and 14, the first end 1002 of the plastic bracket 1000 may define a bracket rail 1300 configured to slidably engage a housing rail 1302 defined on a portion 1004 of the housing 806 of the sensor assembly 804. The bracket and housing rails 1300, 1302 are shaped and/or sized to slidingly cooperate, allowing the sensor assembly 804 to be adjusted to multiple positions relative to the coupling position where the second end 1006 of the bracket 1000 is coupled to at least a portion of one of the rails 402, 406 (shown in FIG. 15). Referring to FIG. 15, the sensor assembly 804 may be coupled to the bracket 1000 such that the sensor 804 may be configured to move relative to the bracket 1000 in a direction indicated by arrow A from a first bracket position 1000*a* to at least a second bracket position 1000*b*.

Figure 16:
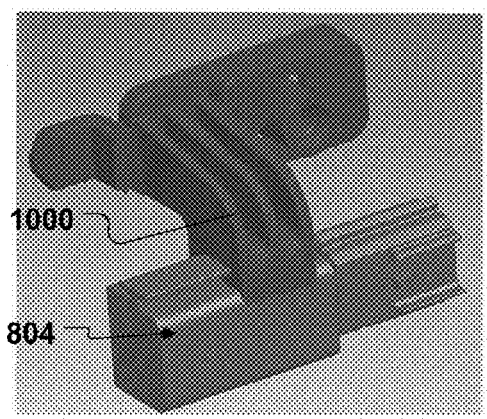
Figure 17:
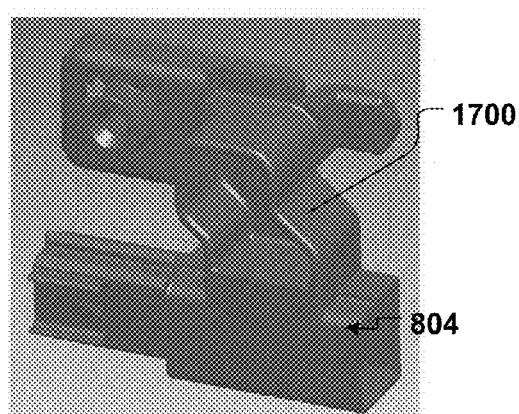

FIGS. 16-17 illustrate various mechanical connections for coupling a sensor assembly consistent with the present disclosure to a rail of a vehicle seat rail assembly. Referring to FIG. 16, the flexible bracket 1000 may be mechanically attached to the sensor assembly 804 and/or first and/or second rails of the vehicle seat rail assembly. As generally understood by one of ordinary skill in the art, various means of mechanical attachment may be used, such as using a fastener or plastic clip or screws or rivets. Referring to FIG. 17, the flexible bracket 1700 may be over-molded to the sensor assembly 804.

The flexible bracket 1000 may be resiliently adjusted to optimize the positioning of the sensor assembly 804 in a variety of different vehicle seat rail assemblies and/or platforms. The flexible bracket 1000 thus allows the sensor assembly 804 to be adjustably positioned relative to the rails 402, 406 to provide flexibility in the Hall switch point, operating air gap and clearance from the carpet/vehicle floor. The magnetic field delta between the two sensor states may thus be maximized providing a magnet 808 having a relatively small reversible temperature coefficient compared to a ferrite magnet, e.g. a NdFeB or SmCo magnet, and selecting the sensor component geometry and location to ensure operation for a wide range of temperatures and air gap tolerances.

In one aspect, the present disclosure may feature a sensor assembly configured to sense a position of a seat in a vehicle. The sensor assembly may include a housing defining a cavity and having an open end. The sensor assembly may also include a carrier removably disposed in the housing cavity via the open end, wherein a permanent magnet may be disposed within a magnet cavity defined in the carrier, wherein the permanent magnet may establish a magnetic field. The sensor assembly may further include a single pole disposed within a pole cavity defined in the carrier and spaced from the permanent magnet and positioned in the magnetic field. In addition, the sensor assembly may include a magnetic sensor element affixed to a printed circuit board (PCB) and positioned in the magnetic field and adjacent to an end of the single pole. The magnetic sensor element and PCB may be at least partially disposed within the cavity.

In yet another aspect, the present disclosure may feature a system for sensing a position of a seat in a vehicle. The system may include a vehicle seat rail assembly configured to movably couple the seat to the vehicle. The vehicle seat rail assembly may include a first rail and a second rail, wherein the first rail may be configured for movement with the seat relative to the second rail. The system may further include a sensor assembly coupled to one of the first rail or the second rail. The sensor assembly may include a housing defining a cavity and having an open end. The sensor assembly may also include a carrier removably disposed in the housing cavity via the open end, wherein a permanent magnet may be disposed within a magnet cavity defined in the carrier, wherein the permanent magnet may establish a magnetic field. The sensor assembly may further include a single pole disposed within a pole cavity defined in the carrier and spaced from the permanent magnet and positioned in the magnetic field. In addition, the sensor assembly may include a magnetic sensor element affixed to a printed circuit board (PCB) and positioned in the magnetic field and adjacent to an end of the single pole. The magnetic sensor element and PCB may be at least partially disposed within the cavity. When the first rail is in a first position relative to the second rail, the magnetic sensor element may be configured to provide a first output in response to a first level of magnetic flux from the magnet directed to the magnetic sensor element. When the first rail is in a second position relative to the second rail, the magnetic sensor element is configured to provide a second output different from the first output in response to a second level of magnetic flux from the magnet directed to the sensor element.

In another aspect, the present disclosure may feature a method of sensing a position of a seat in a vehicle. The method may include providing a sensor assembly coupled to one of a first rail or a second rail of a vehicle seat rail assembly configured to be movably coupled to the seat of the vehicle, the first rail configured for movement with the seat relative to the second rail. The sensor assembly may include a housing defining a cavity and having an open end. The sensor assembly may also include a carrier removably disposed in the housing cavity via the open end, wherein a permanent magnet may be disposed within a magnet cavity defined in the carrier, wherein the permanent magnet may establish a magnetic field. The sensor assembly may further include a single pole disposed within a pole cavity defined in the carrier and spaced from the permanent magnet and positioned in the magnetic field. In addition, the sensor assembly may include a magnetic sensor element affixed to a printed circuit board (PCB) and positioned in the magnetic field and adjacent to an end of the single pole. The magnetic sensor element and PCB may be at least partially disposed within the cavity.

The method may further include providing a first output using the magnetic sensor element in response to a first level of magnetic flux from the magnet directed to the magnetic sensor element when the first rail is in a first position relative to the second rail. The method may further include providing a second output different from the first output using the magnetic sensor element in response to a second level of magnetic flux from the magnet directed to the magnetic sensor element when the first rail is in a second position relative to the second rail. Additionally, the method may include determining the position of the seat via the first and second outputs provided by the magnetic sensor element.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

What is claimed is:

1. A system for sensing a position of a seat in a vehicle, said system comprising:
    a vehicle seat rail assembly configured to movably couple said seat to said vehicle, said vehicle seat rail assembly comprising a first rail and a second rail, wherein one of said first rail or said second rail is moveable with respect to the other; and
    a sensor assembly coupled to said first rail, said sensor assembly comprising:
        a housing defining a cavity;
        a carrier disposed in said housing;
        a permanent magnet disposed within a magnet cavity defined in said carrier, said permanent magnet establishing a magnetic field;
        a single pole disposed within a pole cavity defined in said carrier and spaced from said permanent magnet and positioned in said magnetic field;
        a magnetic sensor element affixed to a printed circuit board (PCB) and positioned in said magnetic field and adjacent to an end of said single pole, said magnetic sensor element and said PCB at least partially disposed within said cavity; and,
        a plastic bracket having a first and a second end, said first end of said plastic bracket defining a bracket rail configured to slidably engage a housing rail defined on said housing and to allow adjustment of said sensor assembly relative to a coupling position of said sensor assembly and bracket to one of said first rail or said second rail, and said second end configured to be coupled to at least a portion of said first rail;
    wherein, when said first rail is in a first position relative to said second rail, said magnetic sensor element is configured to provide a first output in response to a first level of magnetic flux from said magnet directed to said magnetic sensor element;
    wherein, when said first rail is in a second position relative to said second rail, said magnetic sensor element is configured to provide a second output different from said first output in response to a second level of magnetic flux from said magnet directed to said magnetic sensor element.

2. The system of claim 1 wherein said sensor assembly further comprises an integral connector configured to provide said first output and said second output from said PCB to a vehicle controller.

3. The system of claim 1 wherein said magnetic sensor element comprises a Hall Effect sensor.

4. The system of claim 3 wherein said Hall Effect sensor comprises a flux receiving surface and being responsive to said first and second levels of magnetic flux imparted to said flux receiving surface to provide said first and second outputs.

5. The system of claim 1 wherein said magnet comprises material selected from the group consisting of NdFeB and SmCo.

6. A sensor assembly configured to sense a position of a seat in a vehicle, said sensor assembly comprising:
 a housing defining a cavity configured to be coupled to a first rail of a vehicle seat rail assembly, wherein one of said first rail or a second rail of said vehicle seat rail assembly is moveable with respect to the other;
 a carrier removably disposed in said housing cavity;
 a permanent magnet disposed within a magnet cavity defined in said carrier, said permanent magnet establishing a magnetic field;
 a single pole disposed within a pole cavity defined in said carrier and spaced from said permanent magnet and positioned in said magnetic field; and
 a magnetic sensor element affixed to a printed circuit board (PCB) and positioned in said magnetic field and adjacent to an end of said single pole, said magnetic sensor element and said PCB at least partially disposed within said cavity;
 a plastic bracket having a first and a second end, said first end defining a bracket rail configured to slidably engage a housing rail defined on said housing and to allow adjustment of said sensor assembly relative to a coupling position of said sensor assembly to one of said first rail or said second rail, and said configured to be coupled to at least a portion of said first rail.

7. The sensor assembly of claim 6 wherein said sensor assembly is configured to be coupled to one of said first rail or said second rail of a vehicle seat rail assembly configured to movably coupled said seat to said vehicle, said first rail configured for movement with said seat relative to said second rail.

8. The sensor assembly of claim 7 wherein, when said first rail is in a first position relative to said second rail, said magnetic sensor element is configured to provide a first output in response to a first level of magnetic flux from said magnet directed to said magnetic sensor element and wherein, when said first rail is in a second position relative to said second rail, said magnetic sensor element is configured to provide a second output different from said first output in response to a second level of magnetic flux from said magnet directed to said magnetic sensor element.

9. The sensor assembly of claim 6, wherein said plastic bracket is over-molded onto said housing.

10. The sensor assembly of claim 6 further comprising an integral connector configured to provide said first output and said second output from said PCB to a vehicle controller.

11. The sensor assembly of claim 6 wherein said magnet comprises material selected from the group consisting of NdFeB and SmCo.

12. The sensor assembly of claim 6 wherein said magnetic sensor element comprises a Hall Effect sensor.

13. The sensor assembly of claim 12 wherein Hall Effect sensor comprises a flux receiving surface and being responsive to said first and second levels of magnetic flux imparted to said flux receiving surface to provide said first and second outputs.

14. A method of sensing a position of a seat in a vehicle, said method comprising:
 providing a sensor assembly comprising:
  a housing defining a cavity;
  a carrier disposed in said housing cavity;
  a permanent magnet disposed within a magnet cavity defined in said carrier, said permanent magnet establishing a magnetic field;
  a single pole disposed within a pole cavity defined in said carrier and spaced from said permanent magnet and positioned in said magnetic field;
  a magnetic sensor element affixed to a printed circuit board (PCB) and positioned in said magnetic field and adjacent to an end of said single pole, said magnetic sensor element and said PCB at least partially disposed within said cavity; and
  a plastic bracket having a first and a second end, said first end of said plastic bracket defining a bracket rail;
 securing said second end of said plastic bracket to at least a portion of a first rail of a vehicle seat rail assembly configured to be movably coupled to said seat of said vehicle, wherein one of said first rail or a second rail of said vehicle seat rail assembly is configured to move with respect to the other;
 slidably engaging said bracket rail with said housing rail to allow adjustment of said sensor assembly relative to a coupling position of said sensor assembly and bracket to one of said first rail or said second rail; and
 providing an output using said magnetic sensor element, wherein said output is representative to sense a flux density that varies based on a presence or an absence of said second rail within said magnetic field.

* * * * *